March 1, 1938.  C. W. GORDON  2,109,840
CONTROL OF HEAT ABSORPTION
Filed June 12, 1934   2 Sheets-Sheet 2

INVENTOR
CHARLES W. GORDON
BY
ATTORNEY

Patented Mar. 1, 1938

2,109,840

UNITED STATES PATENT OFFICE 2,109,840

CONTROL OF HEAT ABSORPTION

Charles W. Gordon, Munster, Ind., assignor to The Superheater Company, New York, N. Y.

Application June 12, 1934, Serial No. 730,193

2 Claims. (Cl. 122—459)

My invention relates to control of heat absorption in a boiler furnace chamber and aims to maintain the operating conditions for a boiler auxiliary within desired limits over a wide range of load.

An installation exemplifying my apparatus invention may conveniently comprise a boiler installation having a combustion chamber provided with a water wall section and having one or more auxiliaries such as superheater, economizer, or air heater. The combustion chamber is provided with a plurality of burners each adjustable independently of the other or others so that the rate of absorption of radiant heat by said water wall section can be varied at the will of the operatives to maintain the operating conditions for one of the boiler auxiliaries within desired limits. In accordance with my method invention, I vary the percentage amount of heat absorbed by the furnace water wall section of a boiler in such a way that the operating conditions of a given boiler auxiliary can be maintained within desired limits over a considerable load range. The desired percentage variation of heat absorption by such water wall can be obtained within my invention either by varying the percentage amounts of fuel consumed by two or more burners or by varying the angles of discharge of one or more of the burners, or by varying both factors at once.

In order that my invention, together with its objects and advantages may be more fully and readily understood, I will now describe by way of example a superheater boiler in accordance with my apparatus invention and adapted to operate in accordance with my novel method, such boiler being selected from a number of possible embodiments of the apparatus invention, and illustrated in the accompanying drawings.

Figure 1:
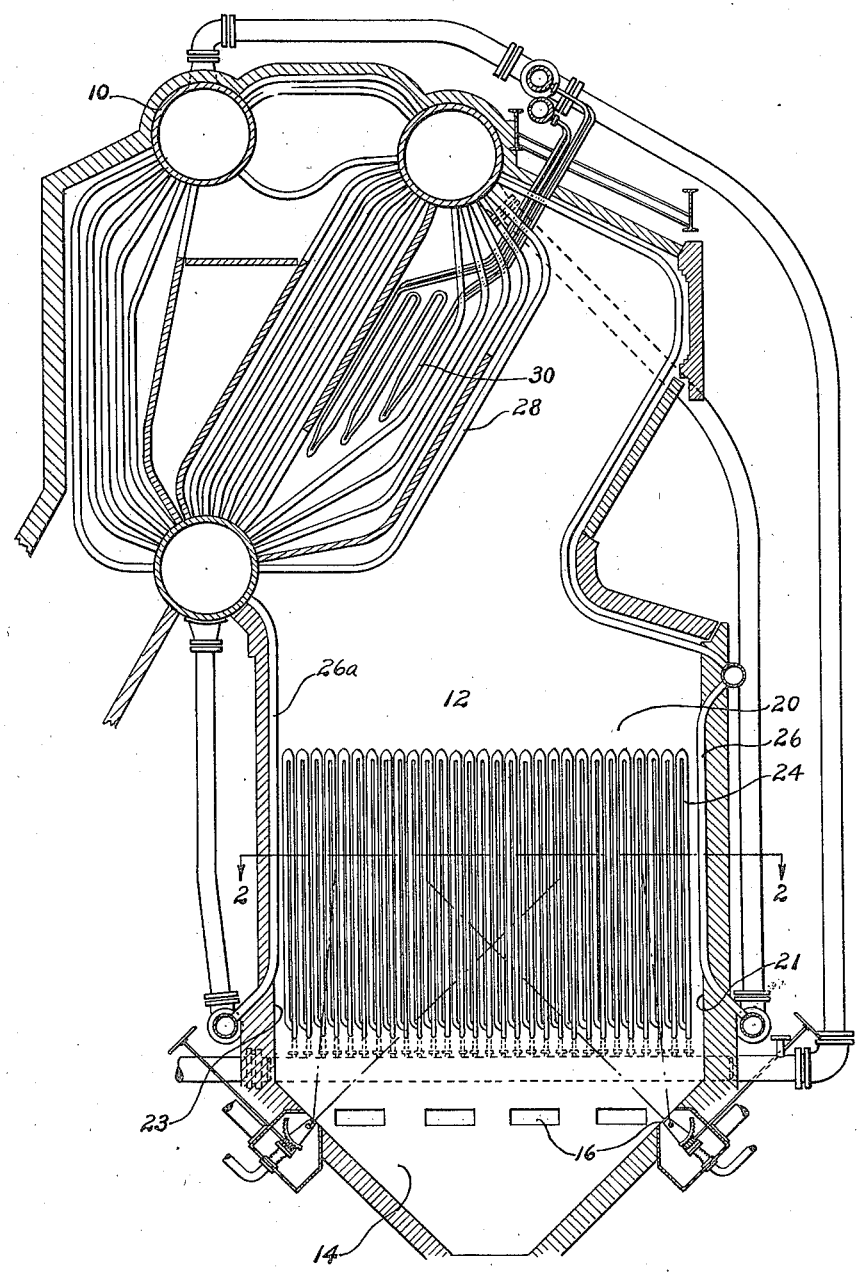
Fig. 1 is a sectional elevation through a superheater boiler in accordance with my invention.
Figure 2:
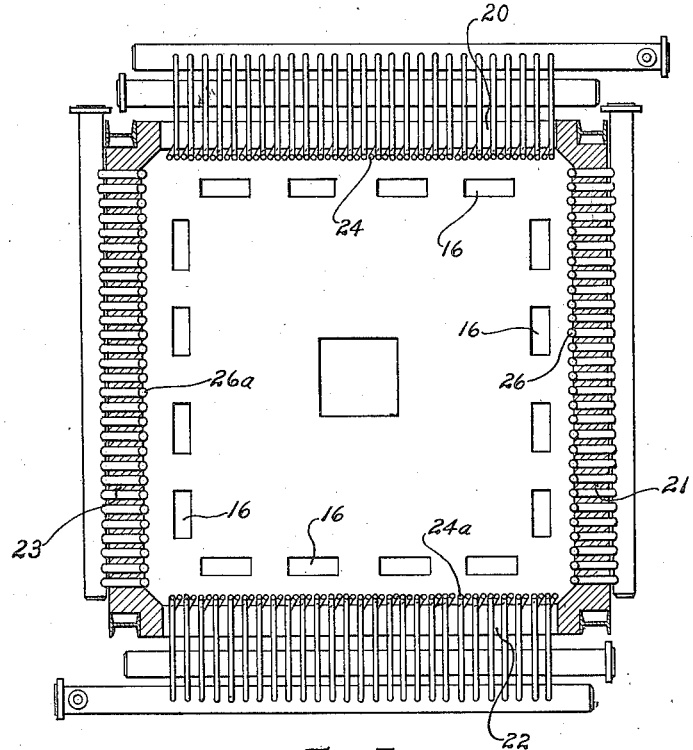
Fig. 2 is a horizontal section on a line 2—2 of Fig. 1 looking in the direction of the arrows.
Figure 3:
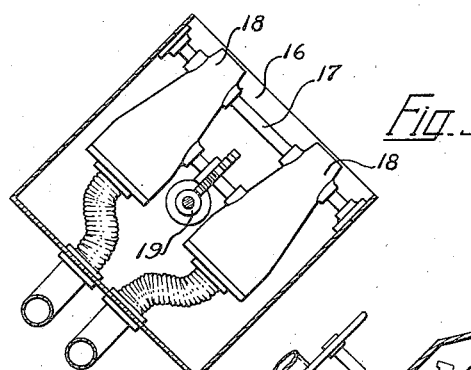
Figs. 3 and 4 are detail sectional views of the burners shown in Fig. 1.
Figure 4:
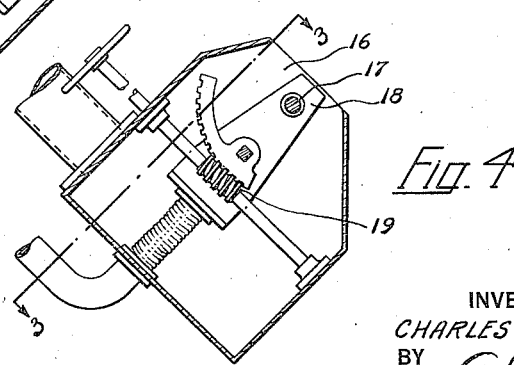

The arrangement illustrated in the drawings comprises a Stirling type boiler 10 having a furnace chamber 12 the bottom 14 of which slopes to outline an inverted four-sided pyramid. In the bottom 14, near the lower ends of the side walls 20, 21, 22, and 23 of chamber 12, I provide a plurality of burner openings 16, 16 in each face of the bottom. The burners 18 associated with such openings preferably are adjustable either to deliver their flames nearly vertical and so parallel to the side walls of chamber 12 or to divert the flames away from such side walls. Burners 18 are of a known type for burning powdered coal and are supported by spindles 17 pivoted near the mouths of openings 16 so as to discharge either nearly vertically in front of walls 20, 21, 22, and 23 or at an angle of about 45° or more to the vertical. Adjustment of burners 18 is accomplished by gearing 19. Along the inner faces of opposite side walls 20 and 22, 1 have shown groups of vertical heat absorbing tubes of one character and along the other two opposed side walls 21 and 23 I have shown groups of vertical heat absorbing tubes of a different character. On the inner face of wall 20, the heat absorbing tubes form parts of a radiant type superheater section 24 while the tubes on the inner face of wall 22 comprise in part a second radiant type superheater section 24a. The tubes on the inner face of wall 21 are shown as forming a steam generating water wall 26 while those on the inner face of wall 23 form a second steam generating water wall 26a. Above the furnace chamber 12 I have shown the usual banks of bent generating tubes 28 and, enclosed by such tubes, a convection type superheater 30 which may be connected to operate either in series or in parallel with the radiant superheaters 24 and 24a.

While I have illustrated a boiler having radiant and convection superheater sections, it will be clear from the following that my invention is not limited to the use of both a radiant and a convection superheater section or, indeed, to a superheater installation, since my invention is of considerable utility in connection with boiler auxiliaries such as economizers and air heaters as well as with superheaters.

In the operation of the apparatus illustrated in the drawings, under conditions such that it is desired to increase the amount of heat absorption by radiant superheaters 24 and 24a, the burners 16 which discharge near the lower ends of walls 20 and 22 are forced more strongly, are turned so that the flames produced thereby lie closer to the vertical to increase the radiation in the direction of such superheaters, or the amount of excess air used by such burners is reduced to increase the temperature of the flames delivered thereby, or the amount of heat absorption may be increased by any desired combination of such steps. Similarly, the burners 16 which discharge near the lower ends of the walls 21 and 23 can be varied in any of the ways mentioned in connection with the other burners, or in several such ways at once, to increase or to decrease, when so desired, the amount of heat absorbed by the water walls 26 and 26a.

It will be seen that I am able to regulate the conditions of heat absorption with respect to the radiant superheaters very much as desired and at the same time quite independently of the conditions for heat absorption of the steam generating tubes, either the radiant water wall tubes or the convection heated tubes. Of course, the amount of heat required to be absorbed by the generating tubes is fixed by the load on the boiler, but the total heat generated in the furnace chamber can be divided between the steam generating function and the superheating function in accordance with my invention in the manner or proportion best suited to a particular load at any time to maintain the superheat temperature substantially constant or within desired limits over a wide range of load.

It will be understood that the burners 16 in front of the superheaters 24 and 24a are never swung to such an extent that the flames from such burners shall impinge materially on the superheater surface, the flames from such burners, if directed other than in the vertical direction, being inclined toward the center of the furnace.

The advantages of my novel arrangement and method of operation are readily apparent and comprise:

1. Practically every cubic foot of combustion volume is efficiently utilized.

2. The load on the radiant heat absorbing surface is uniformly distributed, thus reducing severe localized punishment.

3. Slagging is reduced since hot spots are eliminated.

4. The steam temperature from radiant superheaters can be controlled by regulation of the firing intensity, thus assuring the same steam temperature at all loads and under practically all conditions of the heating surface as regards cleanliness. At low loads the rate of firing of burners discharging in front of the superheater surface will be reduced at a greater rate than those discharging in front of the water cooled wall sections because of the dropping temperature characteristic of a radiant superheater, and the rate of firing of such burners gradually increased as the ratings increase. Again, as either surface becomes fouled, the relative intensity of firing in front of such surface can be increased to maintain the desired steam temperature.

5. The adjustment of the angle of the burners provides an adjustment in the radiant heat absorption since the absorption decreases as the burners are directed toward the center of the furnace and away from the side walls.

6. My design also provides an opportunity to fire the burners in front of the superheater surfaces differently from the others as regards the excess air, fineness of fuel particles, rate of fuel combustion, or angle of discharge, number of idle burners, temperature of air for combustion, impregnation of flames with material such as benzol affecting luminosity of flames or any combination of such factors.

What I claim is:

1. The method of maintaining a substantially constant superheated steam temperature in a boiler having steam generating elements on a portion of the wall of its combustion chamber, a superheater supplied with steam from said elements on an adjacent wall, and a plurality of burners adjustable to change the direction or intensity of the flames therefrom, some of said burners being located in front of said generating elements and others in front of said superheater, which comprises; supplying said burners with an amount of fuel sufficient to generate and superheat to a predetermined temperature the amount of steam required at a certain load; adjusting said burners to apportion the heat produced by said amount of fuel between said generating elements and superheater, respectively, for generating the amount of steam required and superheat it to said predetermined temperature; and, upon change in steam demand, adjusting said burners to vary the percentage proportion of heat absorbed by said generating elements as compared to that absorbed by said superheater in greater degree than would occur by varying equally the amounts of fuel consumed by the burners heating said elements and superheater, respectively.

2. The method of operating a boiler having steam generating elements on a portion of the wall of its combustion chamber, a superheater deriving steam from said elements on an adjacent wall, and a plurality of burners adjustable to change the direction of the flames therefrom, some of said burners being located in front of said generating elements and others in front of said superheater, which comprises; directing flames from at least one of said burners to discharge in front of said superheater without substantial impingement thereon, and maintaining the temperature of superheated steam substantially constant by adjusting the angles of direction of the flames from said burners in front of said superheater to vary the percentage proportion of heat absorbed by said superheater as compared with that absorbed by said generating elements in greater degree than would occur by changing equally the amounts of fuel consumed by the burners heating said superheater and generating elements, respectively.

CHARLES W. GORDON.